March 20, 1934.    E. E. BLOUNT    1,951,817
AIRPLANE-HELICOPTER
Filed Aug. 2, 1933    4 Sheets-Sheet 1

INVENTOR
Earle E. Blount

March 20, 1934.  E. E. BLOUNT  1,951,817
AIRPLANE-HELICOPTER
Filed Aug. 2, 1933  4 Sheets-Sheet 2

INVENTOR
Earle E. Blount

March 20, 1934. E. E. BLOUNT 1,951,817
AIRPLANE-HELICOPTER
Filed Aug. 2, 1933  4 Sheets-Sheet 4

INVENTOR
Earle E. Blount

Patented Mar. 20, 1934

1,951,817

UNITED STATES PATENT OFFICE 1,951,817

AIRPLANE-HELICOPTER

Earle E. Blount, Dayton, Ohio

Application August 2, 1933, Serial No. 683,331

21 Claims. (Cl. 244—15)

The present invention relates generally to aircraft and more particularly to improvements in aircraft of that type in which are combined both the properties of an airplane and also those of a helicopter in that it shall be capable not only of horizontal flight in the manner of an ordinary airplane, but also of vertical ascent and descent and of hovering in any desired position in the manner of a helicopter.

Those skilled in the art of aeronautics, readily recognize the many advantages to be gained in being able to ascend or descend vertically and in being able to fly horizontally at high speeds after ascending. Thus far, however, many difficulties in design and construction have been found to exist which have rendered this type of aircraft impractical as a means of transportation.

One of the principal disadvantages of the helicopters built thus far lies in the fact that they are incapable of high forward speed. As is well known, aircraft of this general type depends for sustentation or vertical flight upon rotating or revolving air screws or propellers directly or indirectly developing the requisite vertical lift for flight, whose axes are substantially at right angles to the direction of motion in horizontal flight. This involves either the use of a secondary or auxiliary means of propulsion, directed horizontally, or the tilting of the sustaining propellers to give a horizontal component, either of which is highly inefficient from a practical standpoint.

Aircraft of another type are constructed so that the axis of rotation of the propellers is vertical, in order to lift the machine into the air vertically, but may be tilted after sufficient vertical ascent, until said axis is approximately horizontal, to provide forward propulsion, sustentation during horizontal flight being provided by other parts of the aircraft. There are two principal reasons why machines of this type are not successful from a practical standpoint. The first lies in the fact that the propellers are poorly located, usually being blanketed by the wings, fuselage or other fixed portions of the structure during vertical ascent and also being incapable of proper streamlining for rapid horizontal flight. The more important reason, however, lies in the fact that ordinarily the air screws or propellers are not designed so as to obtain high efficiency in both low speed vertical ascent and rapid horizontal flight. In addition to this, most of the designs retain the external appearance and characteristic parts of the conventional aircraft, with their inherent disadvantages, as for example, the conventional landing gear with its high parasite drag.

The present invention has as one of the main and fundamental objects therefore, a solution of the foregoing problems and a substantial elimination of the disadvantages attending machines capable of both vertical and horizontal flight.

A further object of the present invention is to provide an airplane of the vertical lift type in which the main supporting surfaces and power units are capable of being readily rotated or manipulated from positions for forward flight into positions for vertical flight in a manner such that the sustaining surfaces, streamlined bodies and other appendages meet the air edgewise at all times, thus offering a minimum resistance to motion in whatever direction the aircraft is going. By means of the arrangement contemplated, during vertical ascent, the propellers have nothing to blanket them or impede their reaction on the free air, and nothing to interfere with or retard the slipstream except friction against a smoothly streamlined nacelle body, within which the power units are enclosed, and the thin profile of the wings or sustaining surfaces and control surfaces. In horizontal flight, this ability to rotate the sustaining surfaces or motor nacelles completely into a horizontal position enables the pilot to adjust the aircraft to give the absolute minimum of air resistance and thus the maximum forward speed.

A further object of the present invention is the mounting and disposition, in an aircraft of this type, of the propellers and power units in streamline nacelles laterally and on opposite sides of the longitudinal axis of the aircraft and to further provide for each motor nacelle, control surfaces of which the pair or pairs corresponding to elevators in the ordinary airplane shall also be capable of differential operation in opposite directions, giving the pilot complete control of the aircraft at all times through the use of only two sets of control surfaces instead of the conventional three.

A still further object of the present invention resides in the manner in which the control lever for the control surfaces is supported so as to be rotated about a plurality of intersecting axes, the control lever being mounted upon a shaft which in turn is held by a second shaft, the two shafts and the axis of the lever all intersecting at a common point.

A still further object of the present invention is to mount a landing wheel or skid in the rear end of each motor nacelle in a manner such that when landing from vertical flight the landing gear will have strictly vertical travel and yet will be automatically retracted into a completely shielded position, fully streamline within the motor nacelles during horizontal flight. In this manner it is possible to position the main landing gear directly beneath the major weights to be supported, giving a high degree of structural efficiency in the sense of combining great strength with economy of material and simplicity of construction, as well as effecting a desirable distribution of weight over the supporting points in landing.

A still further important object of the present invention is to provide in combination with the power unit of the aircraft, an articulated adjustable pitch propeller. This is especially essential in machines of this character wherein it is desired to change the axis of rotation of the propeller from the horizontal during horizontal flight to the vertical when ascending or descending vertically. Propellers of the conventional type cannot ordinarily give the aircraft sufficient lift to effect vertical ascent and if one were made sufficiently large and pitched low enough to provide the requisite lift, it would become completely inactive as a thrust producer before the aircraft had reached any considerable degree of horizontal speed. On the other hand, an adjustable pitch propeller can be designed to operate properly with any type of engine used in the aircraft and give sufficient lift to raise the aircraft vertically into the air at a satisfactory rate of climb and yet, with its pitch gradually increased as the wing nacelle unit is rotated into horizontal position, deliver the power of the engine to the air in high speed horizontal flight with greater efficiency than an ordinary propeller designed for an aircraft having that speed. Of course, propellers of this type would be larger in diameter than ordinary propellers but yet smaller than the usual propellers used in the conventional helicopter, turning at a slower rate of speed than in the case of propellers for conventional airplanes but at a faster rate of speed than the propellers of air screws used ordinarily in helicopters.

In an aircraft of this type, and during the period of rotating the wing nacelle unit into the horizontal position, as the aircraft is increasing its horizontal speed, the oncoming air will meet the propeller blade at an oblique angle, causing a difference in thrust between the advancing and receding blades. Under these circumstances, if a conventional adjustable pitch propeller were used, this difference in thrust would result in severe stresses not only in the propellers but in the engine mounts. The difference of angle of attack of the advancing and receding blades, which causes the difference in thrust, also results in great loss of aerodynamic efficiency of the propeller. On the other hand, in the case of the combination of an adjustable pitch propeller, the blades of which are of the articulated type, and are movable to a limited extent in a direction approximately at right angles to the plane of the propeller disc, a high efficiency is insured for the propeller or propellers at all times and stresses from these blades, with the exception of pure tension, are substantially or entirely eliminated. The use of this type of propeller in a machine of this character also eliminates the unbalanced forces on each engine nacelle caused by the uneven thrust when the blades are not of the articulated type. It is contemplated that in using a propeller of this character, it is essential that the blades be restricted against hinging more than a few degrees rearward of the plane of the propeller disc, in order to prevent the blades from striking the wings or other parts of the aircraft; likewise, it is essential that the blades be restricted from hinging too far forwardly in order that they may at all times be approximately in their normal position.

By locating the control surfaces of the aircraft rearward of the motor nacelles, it will be readily apparent, that they remain operative at all times and in all positions of the propellers both for vertical and horizontal flight. They are, thus, always in the slipstream of the propellers, giving positive control throughout every variation in attitude from vertical ascent to horizontal flight, giving greater effectiveness in every attitude than could be otherwise obtained were they placed elsewhere on the aircraft body. Furthermore, this construction lends itself to greater simplicity and more effective operation of the aircraft by obviating the necessity for more than one set of controls. The use of articulating blades in combination with an adjustable pitch propeller practically eliminates gyroscopic action which would otherwise set up stresses in the wings and render the rotation of the wings with respect to the fuselage rather difficult.

It is intended that the engines of the aircraft be turning in opposite directions so that the torques of the propellers compensate one another, that is to say, the right hand engine will be turning clockwise while the left hand engine will be turning counterclockwise. Two main advantages are to be derived from such an arrangement. First, the torque of the engine reduces the bending movements in the wings, especially out near the tips where the wing sections are comparatively thin, thus permitting, because of the reduced stresses, lighter wing construction. Secondly, when the nacelles are located at the wing tip, the race rotation of the slipstream brings the air up against the under side of the wing at a greater angle than that of the wing to the flight path, producing an increase in the lift of the wing. The wing causes it to deflect downwardly again. Friction against the descending blade deflects the air outboard of the nacelles downward (the other half of the race rotation). With the air on both sides of the propeller deflected downwardly, race rotation is greatly eliminated and the loss in efficiency due to it is therefore converted into useful lift.

In the preferred embodiment, it is contemplated to locate the motor nacelles at the tips of the wings which are of just sufficient span that, with the engines at their tips, the propeller blades comfortably clear the fuselage. This has the advantage of placing all the wing between the nacelles and the fuselage, permitting the use of an airfoil section of sufficient chord and depth to give structural rigidity without making the total wing area any greater than just sufficient to support the machine, at the angle of attack for maximum lift-over-drag ratio, at top speed. It is further essential that the weight in and comprising the aircraft be so disposed that the center of gravity of the entire machine, when the wings are in position for vertical ascent, be on or very close to the axis of rotation of the wings. In the preferred embodiment, where the axis of rotation lies, at all points along the span, either on or forward of the maximum ordinate of the section, the weight should be so disposed that the center of gravity of the entire machine, when the wings are in the horizontal position, lies somewhat behind the axis of rotation. They should also be so disposed that when the wings are in the horizontal position, the center of gravity of the entire machine is on or very close to a transverse plane through the center of pressure of the wings for an angle of attack corresponding to the maximum lift-over-drag ratio. The advantages to be derived by this latter are that the requisite area of control surfaces for the machine may be reduced and the readiness with which the machine response to the controls is materially improved.

With the foregoing general objects and certain other objects in view which will be readily apparent to and understood by those skilled in the art of aeronautics from the following explanations, the invention consists in certain novel features in construction and in combination and arrangement of elements, as will be more fully and particularly referred to and specified hereinafter.

Figure 3:
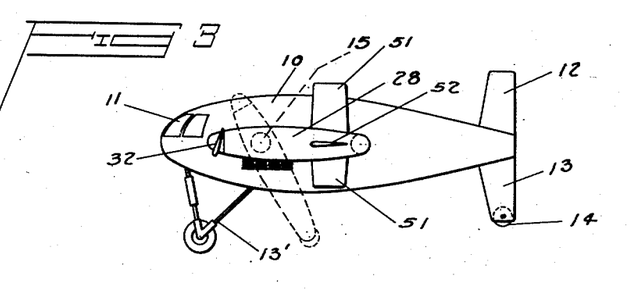
Fig. 3 is a side elevation of Fig. 2.

Referring more particularly to the drawings wherein corresponding parts are designated by like numerals throughout the several views thereof, the airplane-helicopter in the preferred embodiment of my invention herein illustrated comprises generally a fuselage 10 of streamline formation provided with the usual pilot's compartment 11 positioned adjacent the forward end of the fuselage. The rear end of the fuselage is provided with the fixed vertical stabilizing surfaces 12 and 13. As shown in Fig. 3, the lower vertical stabilizing surface 13 may be provided with an auxiliary landing skid or wheel 14 which fits substantially entirely within the walls of this surface with its lower end projecting therefrom sufficiently far to permit rotation of the wheel when contacting with the ground and yet effect a streamlining of the wheel within the surface and cut down drag to as great an extent as possible. Likewise the forward end of the fuselage 10 may have mounted thereon a single wheel type landing gear 13' to assist in landing and prevent nosing over of the aircraft.

Figure 1:
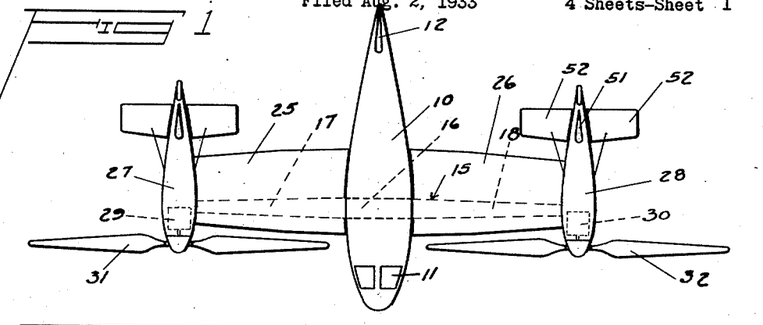
Fig. 1 is a top plan view of my improved airplane-helicopter.
Figures 7, 8, 9:
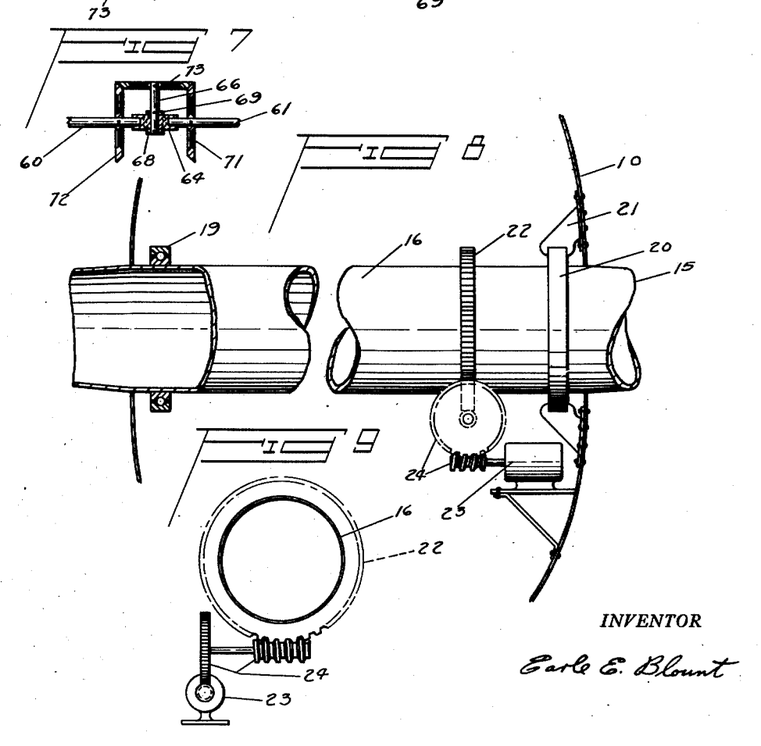
Fig. 7 is a sectional view taken on the line 7—7 of Fig. 5.
Fig. 8 is an enlarged detail view of the apparatus for effecting rotation of the sustaining surfaces of the aircraft.
Fig. 9 is an enlarged detail side view of the gear arrangement illustrated in Fig. 8.

A tubular member 15 having a middle portion 16 of constant diameter and end portions 17 and 18, which may be gradually tapering outwardly, is mounted for rotational movement in antifriction bearings 19 and 20 mounted in suitable supporting members 21, one of which only is shown, which are rigidly supported on opposite sides of the fuselage 10. The tubular member 15, as shown in Figs. 1 and 8 extends transversely of and through the fuselage 10 substantially at the midportion thereof. Any suitable means for effecting rotation of the tubular member 15 may be employed. As shown in Fig. 8, I have shown a ring gear 22 fixedly secured to the central portion of the tubular member 15 which is driven by any suitable means, such as the electric motor 23 through the medium of suitable reduction gearing indicated generally by the numeral 24 in Figs. 8 and 9.

Figure 2:
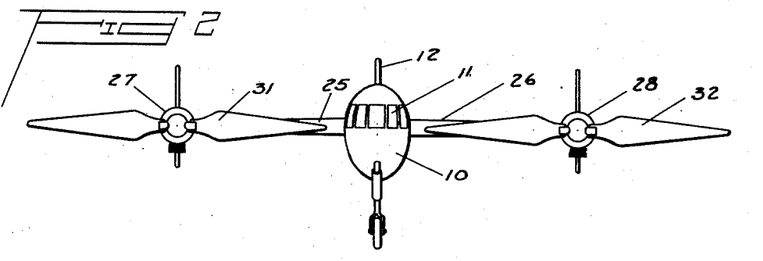
Fig. 2 is a front elevation thereof.

Main supporting airfoils 25 and 26 having cross sections of the "thick wing" type at their inner ends and gradually decreasing in cross section at their outer ends, as shown in Fig. 2, are rigidly mounted on the end portions 17 and 18, respectively, of the tubular member 15.

Figure 13:
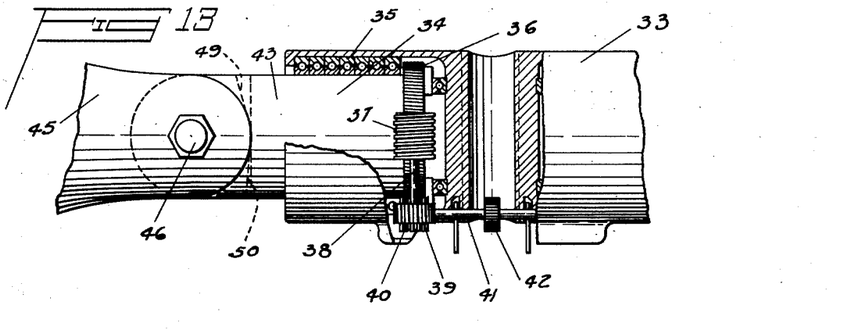
Fig. 13 is a front elevation of the propeller mechanism shown partially in section.
Figure 14:
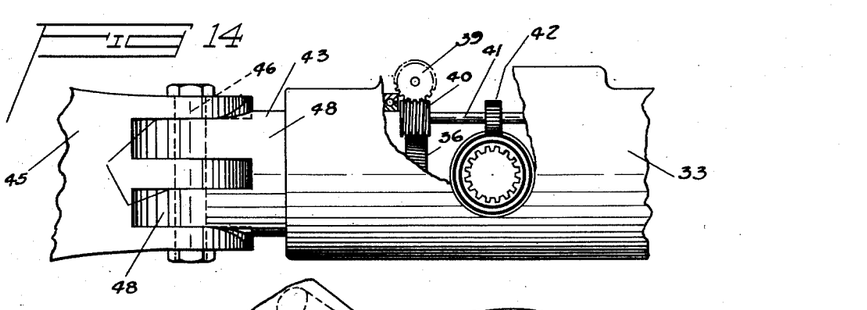
Fig. 14 is a side elevation of Fig. 13.

At the outer ends of the airfoils 25 and 26, on each side of the fuselage and equidistant from the longitudinal center line thereof are mounted horizontally disposed streamlined bodies or motor nacelles 27 and 28 in which internal combustion engines 29 and 30, respectively, may be located for driving the air screws or propellers 31 and 32. The size and shape of these bodies are such as to accommodate the gas tanks, oil tank and other accessories of the engines. The bodies 27 and 28 are incorporated in and project above and below the airfoil surfaces 25 and 26, as shown in Figs. 1 and 2. The end portions of the tubular member 15 may, if desired, terminate in the bodies 27 and 28 and form a support therefor. The propellers 31 and 32 of the internal combustion engines 29 and 30 are arranged for rotation in opposite directions, as is customary in the art. As shown in Figs. 13 and 14, each propeller comprises a hub portion 33 within which the shank ends 34 of the blades of the propeller are adjustably mounted in order to permit of increasing or decreasing the pitch angle of the blades. The shank ends of the blades are suitably mounted in anti-friction bearings 35 mounted in the hub shank. The inner end of each blade has formed thereon gear teeth 36 within which mesh a worm pinion 37 mounted on a laterally disposed rotatable shaft 38. The opposite end of the shaft 38 carries a secondary worm 39 which is in meshing engagement with a driving gear 40 mounted upon a rotatable shaft 41 carried within the hub of the blades. This shaft is at right angles to the shaft 38 and in parallel alignment with the longitudinal axis of the blades. The shaft 41 has centrally mounted thereon a drive pinion 42. Any suitable mechanism (not shown) for rotating the pinion 42 may be provided for rotating the same to effect a movement of the blades of the propeller in opposite directions and change their pitch angles. The blades of the propellers or air screws 31 and 32 are of the "articulated" type; that is to say, each comprises the inner section 43 of which the shank portions 34, heretofore mentioned, form a part and the outer sections 45 which are hinged to the inner sections 43 by laterally disposed bolts 46, the longitudinal axis of which are disposed normal to the axis of rotation of the propellers. It should also be noted by referring to Figs. 13 and 14 that the outer section 45 of each propeller blade 31 and 32 is provided with a plurality of finger-like projections 47 within which are received in telescopic relation a complemental set of finger-like projections 48 formed on the outer end of each inner section. The outer end of the projections 47 are cut off angularly at the point indicated by the numerals 49 and 50. In this manner by observing Fig. 13 in particular, it will be apparent that the outer blade sections are angularly movable to a limited extent in a direction approximately at right angles to the plane of the propeller disc and are restricted against hinging more than a few degrees forwardly or rearwardly of the propeller disc by reason of the construction of the ends of the projections 47 in order to prevent the blades from sticking the airfoils 25 and 26 or other parts of the aircraft and also in order that they may at all times be approximately in their normal position when the propellers are not being rotated.

Figure 4:
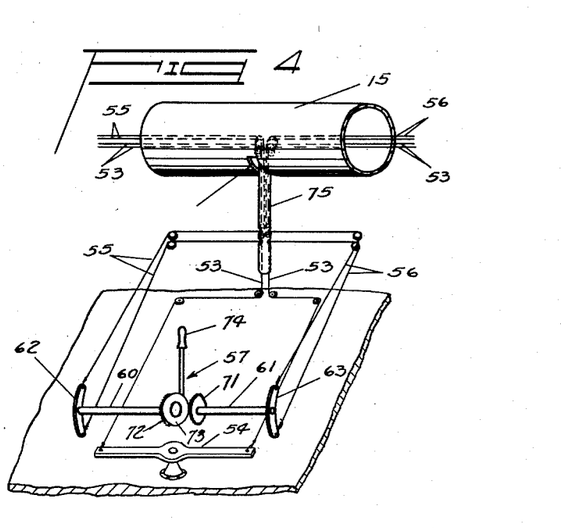
Fig. 4 is a diagrammatic view illustrating the foot and hand control apparatus for the control surfaces of the aircraft.

Vertical and horizontal control surfaces 51 and 52 respectively are mounted on the rear end of each body 27 and 28 and operate in the slipstream of the propellers during both horizontal and vertical flight. As will be noted, the vertical control surfaces or rudders 51 are adapted for being controlled by cables 53 extending into the fuselage of the airplane where they may be connected to any suitable conventional type rudder bar indicated by the numeral 54. The horizontal control surfaces 52, heretofore mentioned, are connected by cables 55 and 56, as shown in Fig. 4, with a manually operated controlling device 57 adapted for being conveniently mounted in the pilot's compartment. As will be noted by referring to Figs. 5, 6, and 7, a plurality of fixed supports 58 each having bearing portions 59 are provided which may be fixedly mounted upon any suitable part of the fuselage, such for example as the floor of the pilot's compartment. The bearing portions 59 support shafts 60 and 61 to which are attached at their outer ends, as shown in Fig. 4, suitable levers 62 and 63 or other devices to which the control cables or wires 55 and 56 may be connected. These shafts fit within the hollow ends of a block 64 provided with a central hole 65 at right angles to the axis of the shafts 60 and 61 through which extends a second shaft 66, the latter being freely rotatable within the hole or bearing 65. It will be seen thus far that the shafts 60 and 61 which are rotatably supported in the fixed bearing portions form a support for the block 64 and shaft 66, while the block 64 forms a support in which the shaft 66 is rotatably mounted. A bifurcated operating member 67 having bifurcations 68 and 69, each of which is rigidly attached to the shaft 66 by means of central pins 70 extending through both shaft 66 and the parts 68 and 69 of the operating member surrounding the shaft, is provided.

Figure 5:
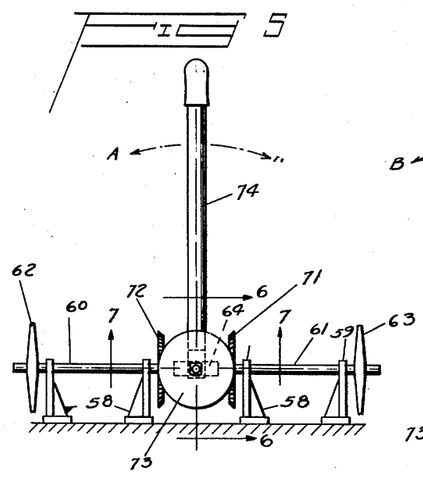
Fig. 5 is a detailed front elevation of the control device for the horizontal control surfaces.
Figure 6:
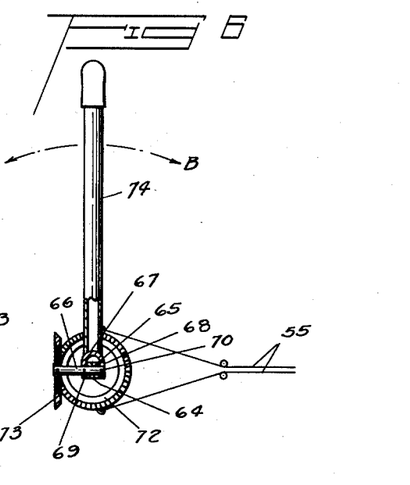
Fig. 6 is a sectional view partly in elevation taken on the line 6—6 of Fig. 5.

A bevel gear 71 is fixed adjacent the end of the shaft 61 by a suitable pin or other attaching device and a similar bevel gear 72 is likewise attached adjacent the end of the shaft 60, as shown in Fig. 5. A third bevel gear 73 is rigidly attached to the end of the shaft 66. Bevel gear 73 meshes with bevel gears 71 and 72 as shown in Fig. 7. The operating member 67 has mounted thereon a control lever 74 which extends vertically upward as shown in Figs. 5 and 6.

The operation of the control device will now be full set forth. The hand control lever 74 is adapted to be movable fore and aft in a longitudinal plane about the axis of the shafts 60 and 61 as shown by arrows "B" in Fig. 6, this movement serving to tilt the shaft 66 so as to raise the left hand end of the shaft 66 upwardly when the upper end of the control lever is moved to the right as viewed in Fig. 6. This will have the effect of equally rotating the gears 71 and 72 so as to cause a correspondingly equal movement of the shafts 60 and 61 and consequently, the control cables 55 and 56 for operating the horizontal control surfaces 52 in correspondingly equal movements and in the same direction.

The control lever 74 is also adapted to rotate laterally about the axis of the shaft 66 as shown by arrows "A" in Fig. 5, such a movement causing a rotation of the gear 73 serving to rotate the gears 71 and 72 to equal degrees in opposite directions. This movement is transmitted through the shafts 60 and 61 so as to cause the horizontal control surfaces 52 on the one motor nacelle to move in one direction while the control surface 52 on the other motor nacelle is moving in an opposite direction in equivalent degrees.

As shown in Fig. 4, the cables for operating the rudder and horizontal control surfaces may be passed through an upstanding tube 75 which may be secured in any suitable fashion in the fuselage framework, the upper end of which is received in a slotted opening 76 formed in the tubular member 15.

Figure 10:
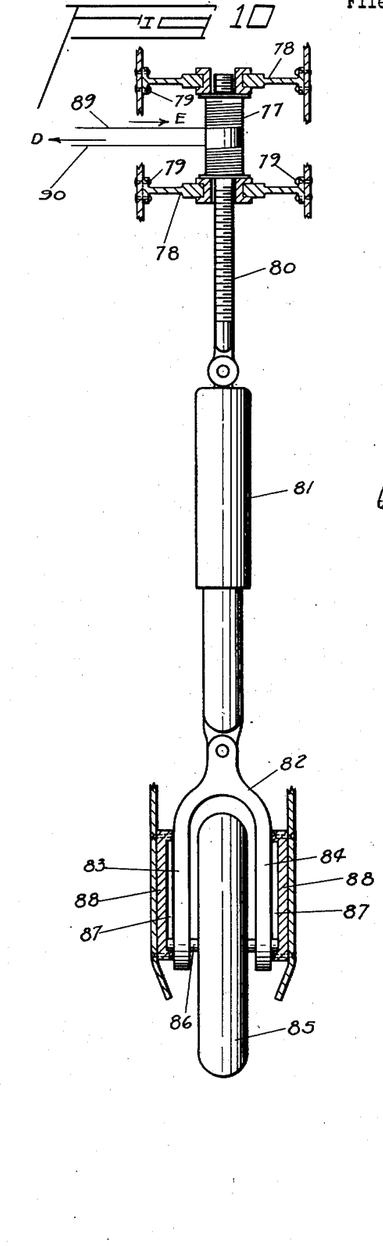
Fig. 10 is an enlarged detail sectional view of the retracting mechanism used in connection with the motor nacelles.
Figure 11:
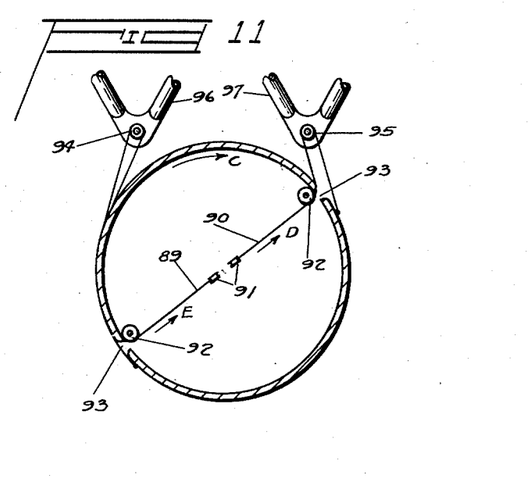
Fig. 11 is a diagrammatic sectional view of the cable arrangement for operating the retracting mechanism.
Figure 12:
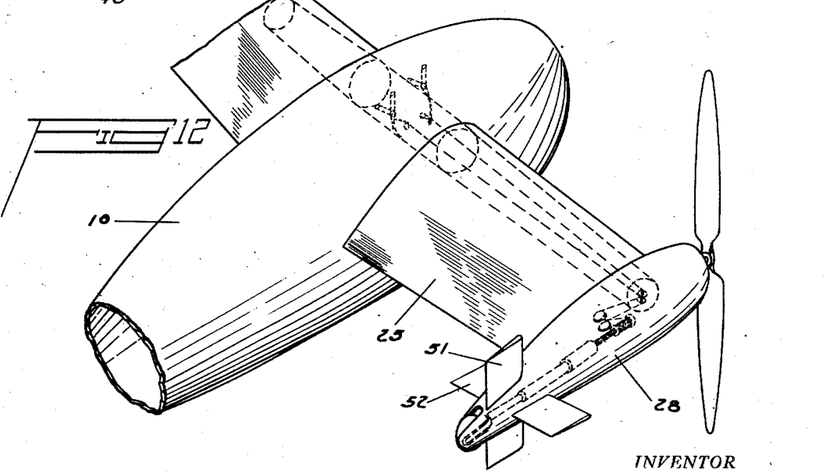
Fig. 12 is a perspective view of the retracting mechanism illustrated in Figs. 10 and 11, showing its positioning within the aircraft.

Referring more particularly to Figs. 10 and 11, the mechanism for retracting the landing wheels into the streamlined bodies as they are being moved from positions for vertical flight into positions for horizontal flight comprises generally a winding drum 77 which is rotatably mounted in the brackets 78 fixedly secured as by rivets 79 or the like to the shell of the streamlined bodies. The winding drum 77 is provided with an internally threaded bore within which is received a longitudinally extending threaded member 80 which is secured at its lower end to the upper end of a landing gear, herein shown as comprising an oleo shock absorbing member 81. The member 81 connects at its lower end to a fork-shaped member 82 the forked ends 83 and 84 of which have mounted therebetween a landing wheel 85 rotatably mounted in a shaft 86 bearing in the lower end of the forked ends of the member 82. The ends of the shaft 86 are prolonged sufficiently to engage in grooves 87 provided in oppositely disposed guideways 88 secured to the shell of the streamlined bodies. The winding drum 77 has wound thereon on opposite directions, as shown in Fig. 10, operating cables 89 and 90 which are passed through the tubular member 15 as shown in Fig. 11. As shown in Fig. 11 the cables 89 and 90 are adapted to pass over a suitable system of pulleys 91 and 92 carried with the hollow interior of the tubular member in any suitable manner, and projected through suitable openings 93 formed in the wall thereof. After passing through the openings 93 each cable is passed over a fixedly supported pulley 94 and 95 respectively, supported on the fuselage framework by means of the supporting members 96 and 97. Thereafter the cables 89 and 90 are fixedly secured to the outside of the tubular members in the manner shown in Fig. 11.

From the foregoing description it will be apparent that when the tubular member 15 is rotated in the direction of the arrow "C" that the cable 90 will be moved in the direction of the arrow "D" and the cable 89 in the direction "E", consequently effecting a resulting rotation of the winding drum 77 to retract the landing wheel in full streamlined position with respect to the streamlined bodies to which they are attached simultaneously as the streamlined bodies are being raised from position for vertical flight into position for horizontal flight.

What I claim is:

1. An aircraft of the class described comprising a fuselage, a rotatably mounted tubular member having its end portions extending transversely through said fuselage beyond the sides thereof, supporting air foils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight and for simultaneously raising said landing wheels into a completely shielded position.

2. An aircraft of the class described, comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected at the ends of said supporting airfoil, motors in each of said streamlined bodies having propellers attached thereto forwardly of said bodies, landing wheels rearwardly mounted in said bodies and in streamlined continuation thereof for supporting said motors and streamlined bodies when in a vertical position and means for moving said supporting airfoils and streamlined bodies from a position for vertical flight into a position for horizontal flight and for simultaneously raising said landing wheels into a completely shielded position fully streamlined in horizontal flight.

3. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting air foils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight and means cooperating with said first mentioned means for simultaneously moving said landing gear into a completely retracted position with respect to said streamlined bodies.

4. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight, means operatively engaged by said tubular member for effecting a relative movement between said landing gear and streamlined bodies to retract said landing gear therein simultaneously as said bodies are being moved from a position for vertical flight into a position for horizontal flight.

5. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight, means operatively engaged by said tubular member for effecting a relative movement between said landing gear and streamlined bodies to retract said landing gear therein automatically and simultaneously as said bodies are being moved from a position for vertical flight into a position for horizontal flight.

6. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight, means operatively engaged by said tubular member for effecting a relative movement between said landing gear and streamlined bodies to retract said landing gear therein simultaneously as said bodies are being moved from a position for vertical flight into a position for horizontal flight, said means comprising a rotatable drum, a member movable longitudinally by rotation of said drum, a shock absorbing landing gear mechanism connected to said longitudinally movable member and cables operatively connected to said drum and connected to said tubular member adapted for rotating said drum as said tubular member is being rotated.

7. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight, means operatively engaged by said tubular member for effecting a relative movement between said landing gear and streamlined bodies to retract said landing gear therein simultaneously as said bodies are being moved from a position for vertical flight into a position for horizontal flight, and means comprising a drum rotatably mounted in said streamlined bodies and provided with a threaded bore, a threaded member movable longitudinally in said drum when said drum is rotated, a landing gear mechanism, a shock absorbing member interconnecting said landing gear mechanism and said threaded member, and cables wound upon said drum in opposite directions, the ends of which are connected to said tubular member in a manner such as to effect a retraction of said landing gear mechanism into said streamlined bodies by rotation of said tubular member.

8. An aircraft of the class described comprising a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said body, landing wheels carried rearwardly of said streamlined bodies and means for moving said supporting airfoils and streamlined bodies from a position for vertical flight into a position for horizontal flight, means operatively engaged by said tubular member for effecting a relative movement between said landing gear and streamlined bodies to retract said landing gear therein simultaneously as said bodies are being moved from a position for vertical flight into a position for horizontal flight, said means comprising a drum rotatably supported in said streamlined bodies, said drum being provided with a central longitudinal threaded bore, a threaded member movable longitudinally in said drum when said drum is rotated, a landing gear mechanism including a fork-shaped member adjacent the rear end of said streamlined bodies, a laterally disposed shaft in said fork-shaped member, a landing wheel rotatable thereon, oppositely disposed guideways in which said shaft is slidably engaged, a shock absorbing member interconnecting said fork-shaped member and said threaded member, and cables wound upon said drum in opposite directions, the ends of which are connected to said tubular member in a manner such as to effect a rotation of said drum simultaneously as said tubular member is being rotated and effect a retraction of said landing wheel into said streamlined bodies.

9. A combined airplane-helicopter comprising a central fuselage, a rotatably mounted tubular member extending transversely through the fuselage beyond the sides thereof, supporting airfoils rigidly mounted on the end portion of said tubular member on opposite sides of said fuselage, streamlined bodies extending transversely of and rigidly connected to said supporting airfoil at each side of said fuselage, motors in each of said streamlined bodies having propellers attached thereto forwardly of said body, landing wheels rearwardly mounted in said streamlined bodies for supporting said motors when in a vertical position, horizontal control surfaces adjacent the rear end of said streamlined bodies, manually operated means in said fuselage for selectively operating said horizontal control surfaces simultaneously and equally or differentially in the same or in opposite directions and means for angularly moving said supporting airfoils and streamlined bodies.

10. A combined airplane-helicopter comprising a central fuselage, a rotatably mounted tubular member having its end portions extending transversely through the fuselage beyond the sides thereof, supporting airfoils rigidly mounted on the end portions of said tubular member on opposite sides of said fuselage, streamlined bodies extending transversely of and rigidly connected to said supporting airfoils on each side of said fuselage, motors in each of said streamlined bodies having propellers attached thereto forwardly of said bodies, landing wheels rearwardly mounted in said streamlined bodies for supporting said motors when in a vertical position, horizontal and vertical control surfaces adjacent the rear end of said streamlined bodies, foot operated means in said fuselage for operating said vertical control surfaces, manually operated means in said fuselage, operable independently of said first mentioned means, for selectively operating said horizontal control surfaces simultaneously and equally or differentially in the same or in opposite directions and means for angularly moving said supporting airfoils and streamlined bodies.

11. A combined airplane-helicopter comprising, a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said bodies, landing wheels carried rearwardly of said streamlined bodies, a gear ring rigidly secured to said tubular member within said fuselage and means operatively connected to said gear ring for rotating said tubular member and for angularly moving said supporting airfoils and streamlined bodies.

12. A combined airplane-helicopter comprising, a fuselage, a rotatably mounted tubular member having its end portions extending transversely through said fuselage beyond the sides thereof, supporting airfoils rigidly mounted on the end portions of said tubular member on opposite sides of said fuselage, streamlined bodies extending transversely of and rigidly connected to said supporting airfoils at each side of said fuselage, motors in each of said streamlined bodies having propellers attached thereto forwardly of said bodies, landing wheels carried rearwardly of said streamlined bodies, a gear ring rigidly secured to said tubular member within said fuselage and electrically actuated means operatively connected to said gear ring for rotating said tubular member and for angularly moving said supporting airfoils and streamlined bodies.

13. A combined airplane-helicopter comprising, a central fuselage, supporting members on opposite sides of said fuselage, anti-friction bearing members supporting in each of said members, a tubular member having a central cylindrical portion mounted in said bearing members and having its end portions extending transversely through said fuselage beyond the sides thereof, supporting airfoils rigidly mounted on the end portions of said tubular member on opposite sides of said fuselage and terminating substantially flush with the sides of said fuselage, streamlined bodies extending transversely of and rigidly connected to said supporting airfoils at each side of said fuselage and equidistant therefrom, motors in each of said streamlined bodies having propellers attached thereto forwardly of said bodies, landing wheels rearwardly mounted in said streamlined bodies for supporting said motors when in a vertical position, a gear ring rigidly secured to said tubular member within said fuselage, and electrically actuated means in said fuselage operatively connected to said gear ring for rotating said tubular member and for angularly moving said supporting airfoils and streamlined bodies.

14. The combination as set forth in claim 3, said manually operated means including a control lever mounted to operate about two axes, the axes intersecting each other and the axis of the lever at a common point, two controlling parts, and means interconnecting said lever and part so as to move said part in the same direction and to equal degrees when said lever is moved from its normal position in one direction and so as to move said parts an equal amount in relatively opposite direction when the lever is moved from its normal position into a position at right angles to said first mentioned movement.

15. The combination as set forth in claim 3, said manually operated means including a lever, a shaft about which said lever is rigidly mounted, a second shaft extending ninety degrees to said first shaft and at ninety degrees to the lever, and supporting said first mentioned shaft, a plurality of members rotatably supporting said second shaft, a fixed bearing for each member, a gear connected to each member, and a gear intermeshing therewith and connected to said first shaft.

16. The combination as set forth in claim 3, said manually operated means including a lever, a shaft upon which said lever is rigidly mounted, a second shaft extending at ninety degrees to the first mentioned shaft and at ninety degrees to the lever and rotatably supporting said first mentioned shaft, a plurality of members rotatably supporting said second shaft, a fixed bearing for each member, a bevel gear connected to each member and a second bevel gear intermeshing therewith and connected to said first mention shaft, whereby said members may be rotated in the same or opposite directions by movement of said lever about one or the other of said shafts.

17. In an aircraft as set forth in claim 1, the blades of said propeller being characterized by being flexibly arranged with respect to said motors in such a manner as to provide freedom for relative movement thereof forwardly and rearwadly in and substantially transversely of their general path of rotative travel in addition to their path of common rotation.

18. In an aircraft as set forth in claim 1, said propellers being characterized by including means whereby the blade portions thereof may swing forwardly and rearwardly with respect to the rotative path of travel to permit automatic variation in their effective aerodynamic angle of attack and to compensate for variations in forces imposed on them in flight.

19. In an aircraft as set forth in claim 1, said propellers being characterized by including hinged joints connecting the roots of the blades independently to their respective hub portions and permitting said blades to swing above and below the mean plane of rotation in response to the centrifugal and lift forces acting upon them during rotation and while moving said supporting airfoils from positions for vertical flight into positions for horizontal flight.

20. In an aircraft as set forth in claim 1, said propellers being characterized by including hinged joints connecting the roots of the blades independently to their respective hub portions and permitting said blades to swing above and below the mean plane of rotation in response to the centrifugal and lift forces acting upon them during rotation and while moving said supporting airfoils from positions for vertical flight into positions for horizontal flight and means for manually changing the pitch setting of the blades of said propellers.

21. In an aircraft as set forth in claim 1, said propellers being characterized by including hinged joints connecting the roots of the blades independently to their respective hub portions and permitting said blades to swing above and below the mean plane of rotation in response to the centrifugal and lift forces acting upon them during rotation and while moving said supporting airfoils from positions for vertical flight into positions for horizontal flight and means for changing the pitch setting of the blades of said propellers.

EARLE E. BLOUNT.